US005485142A

United States Patent [19]
Stute et al.

[11] Patent Number: 5,485,142
[45] Date of Patent: Jan. 16, 1996

[54] REMOTE MONITOR ALARM SYSTEM

[75] Inventors: Robert A. Stute, Orlando; F. Houston Galloway, Cocoa; Pedro J. Medelius, Merritt Island; Robert W. Swindle, Orlando; Tracy A. Bierman, Mims, all of Fla.

[73] Assignee: United States of America as represented by Administrator National Aeronautics and Space Adminisrtation, Washington, D.C.

[21] Appl. No.: 223,481

[22] Filed: Apr. 8, 1994

[51] Int. Cl.$^6$ ........................... G08B 29/00
[52] U.S. Cl. .................. 340/506; 340/505; 340/511; 340/518; 364/138
[58] Field of Search ............................ 340/506, 505, 340/518, 511, 725.06, 825.07, 825.08–825.13, 825.54, 825.22, 825.36; 364/138, 139, 140, 141, 146, 147, 188

[56] References Cited

U.S. PATENT DOCUMENTS

| | | | |
|---|---|---|---|
| 3,516,063 | 6/1970 | Arkin et al. | 340/825.07 |
| 4,144,528 | 3/1979 | Johnson, Sr. | 340/518 |
| 4,228,428 | 10/1980 | Le Nay et al. | 340/518 |
| 4,449,247 | 5/1984 | Waschka, Jr. | 375/10 |
| 4,465,904 | 8/1984 | Gottsegen et al. | 340/518 |
| 4,524,354 | 6/1985 | Morgan | 340/502 |
| 4,668,939 | 5/1987 | Kimura et al. | 340/505 |
| 4,823,290 | 4/1989 | Fasack et al. | 340/825.06 |
| 4,879,541 | 11/1989 | Stefaniu et al. | 340/825.06 |
| 4,885,568 | 12/1989 | Hackett | 340/505 |
| 4,996,703 | 2/1991 | Gray | 379/40 |
| 5,179,376 | 1/1993 | Pomatto | 340/870.02 |
| 5,200,987 | 4/1993 | Gray | 379/40 |
| 5,268,668 | 12/1993 | Berube | 340/505 |

*Primary Examiner*—Donnie L. Crosland
*Attorney, Agent, or Firm*—William J. Sheeham

[57] ABSTRACT

A remote monitor alarm system monitors discrete alarm and analog power supply voltage conditions at remotely located communications terminal equipment. A central monitoring unit (CMU) is connected via serial data links to each of a plurality of remote terminal units (RTUs) that monitor the alarm and power supply conditions of the remote terminal equipment. Each RTU can monitor and store condition information of both discrete alarm points and analog power supply voltage points in its associated communications terminal equipment. The stored alarm information is periodically transmitted to the CMU in response to sequential polling of the RTUs. The number of monitored alarm inputs and permissible voltage ranges for the analog inputs can be remotely configured at the CMU and downloaded into programmable memory at each RTU. The CMU includes a video display, a hard disk memory, a line printer and an audio alarm for communicating and storing the alarm information received from each RTU.

14 Claims, 3 Drawing Sheets

REMOTE MONITOR ALARM SYSTEM

ORIGIN OF THE INVENTION

The present invention was made by employees of the United States Government and may be manufactured and used by or for the government for government purposes without the payment of any royalties thereon or therefor.

BACKGROUND OF THE INVENTION

The present invention relates to a remote monitor alarm system in which power supply and alarm conditions of communication terminal equipment installed at remote sites are monitored and detected by a plurality of remote terminal units which communicate the conditions to a central monitoring unit.

Many large communication systems employ remote terminal equipment whose operational condition must be monitored at a central location. For example, the Kennedy Space Center utilizes a very large fiber optic communication network in which a plurality of remotely located fiber optic terminals transmit information between a number of points. The terminal equipment consists of pulsed frequency modulation terminal equipment, telco style T1 multiplexers, and standard frequency division multiplexers which are provided by various manufacturers. Many of the signals from this equipment are essential during preparation for a launch of the Space Shuttle. It is therefore imperative that operational problems with the remote terminal equipment be communicated and located quickly. Until now, however, NASA did not have any means by which this could be accomplished. Thus, if a problem occurred with remote terminal equipment in the field, the user of the equipment would have to manually inform the technicians of the situation and then the technicians would have to troubleshoot the problem in the field.

The biggest problem with this prior technique is that the user must be actively using the circuit and be able to troubleshoot the equipment to determine whether the communication link has failed or the user's equipment has failed. This process is time consuming and cannot detect problems in the communication link until it is actually being used which creates further delays.

SUMMARY OF THE INVENTION

In view of the foregoing, the present invention seeks to provide a system in which the operational condition of a plurality of remotely located communication terminals and associated equipment can be continually monitored at a central location. This is achieved through provision of a remote monitor alarm system comprising a central monitoring unit (CMU) and a plurality of remote terminal units (RTUs) connected to the CMU. The CMU is located at the site where technical personnel are available to observe the alarm and other conditions, while the RTUs are located at the remote sites where the communication terminal equipment is installed and in operation. Each RTU is connected to a plurality of discrete alarm points and analog power supply voltage points of the equipment being monitored and includes a unique address that is employed by the CMU to request information from each RTU. The CMU successively polls the RTUs and receives back discrete alarm and analog power supply voltage condition information which is communicated to the technicians in any suitable manner, such as video display, paper record or audio alarm.

Each of the RTUs can be programmed to monitor a variable number of discrete alarm points, as well as a variable number of analog power supply voltage points and corresponding voltage ranges. This programming is carried out in the CMU and downloaded into an EEPROM located in the RTU. The CMU can also remotely actuate a plurality of control relays located in each RTU which can be employed, for example, to actuate doors and locks to secure an area in the event of an alarm condition, or to actively control the terminal equipment, e.g., to reset it.

BRIEF DESCRIPTION OF THE DRAWINGS

The above and other features and advantages of the present invention will become apparent from the following detailed description of a preferred embodiment thereof, taken in conjunction with the accompanying drawings in which.

DETAILED DESCRIPTION OF A PREFERRED EMBODIMENT

Figure 1:
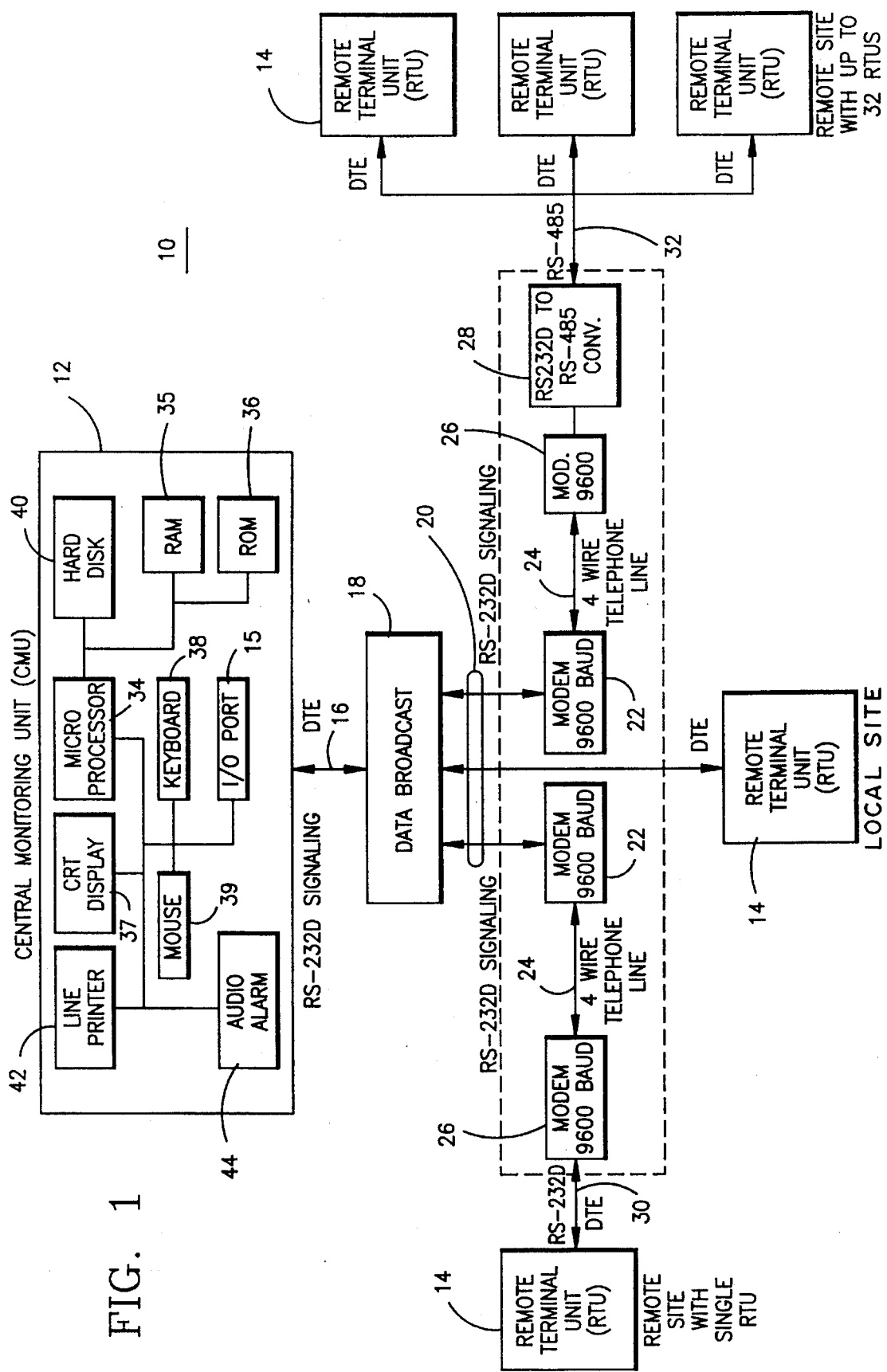
FIG. 1 is a block diagram of a remote monitor alarm system interface constructed in accordance with a preferred embodiment of the present invention.

Turning now to a more detailed consideration of a preferred embodiment of the present invention, FIG. 1 illustrates a remote monitoring alarm system 10 which includes a central monitoring unit (CMU) 12 and a plurality of remote terminal units (RTUs) 14. In the preferred embodiment, the CMU 12 can be connected to up to 200 RTUs. The CMU 12 is connected to each of the RTUs 14 by conventional communications hardware and software. In particular, the CMU 12 includes a serial I/O port 15 that is connected via an RS-232D serial signalling link 16 to a data broadcast unit 18, this being essentially a wired OR circuit that facilitates connection of the CMU 12 to the plurality of RTUs 14. The data broadcast unit 18 is in turn connected through a plurality of RS-232D signalling links 20, either directly to the RTU 14 if it is located at a local site, or to one or more 9600 baud modems 22 for connection to RTUs located at remote sites. Each of the modems 22 is connected via a 4-wire telephone line 24 to another 9600 baud modem 26, which in turn is connected either to a single RTU, or to an RS-232D-to-RS-485 conversion unit 28 in the case of a remote site having a plurality of RTUs. In the former case, another RS-232D signalling link 30 connects the modem 26 to the RTU 14, while in the latter case, an RS-485 signalling link 32 connects the conversion unit 28 to the plurality of RTUs 14. Using the RS-485 signalling link, up to 32 RTUs can be located at the same site and use the same communications link to the CMU 12.

The CMU 12 includes a conventional computer workstation unit including a microprocessor 34 with associated RAM and ROM 35 and 36, respectively, a CRT display 37, one or more input devices such as a keyboard 38 and a mouse 39, a hard disk storage means 40 and a line printer 42. When an alarm condition is detected by one of the RTUs 14, this information is transmitted to the CMU 12 which is programmed as desired to activate an audio alarm 44, display the alarm information on the CRT display 36, store the information on the hard disk 40 and print the information on the line printer 42.

Preferably, the CMU 12 uses a conventional polling technique to interrogate the discrete alarm and power supply voltage status of the equipment monitored by each of the RTUs 14. Each of the RTUs 14 has a unique address which is used by the CMU 12 to send a status request. The polling rate in the preferred embodiment is approximately one RTU per second which means that even in a worst case scenario with 200 RTUs connected to the CMU, a fault condition will be transmitted to the CMU no longer than approximately 3 minutes after it is detected by the RTU.

Figure 2:
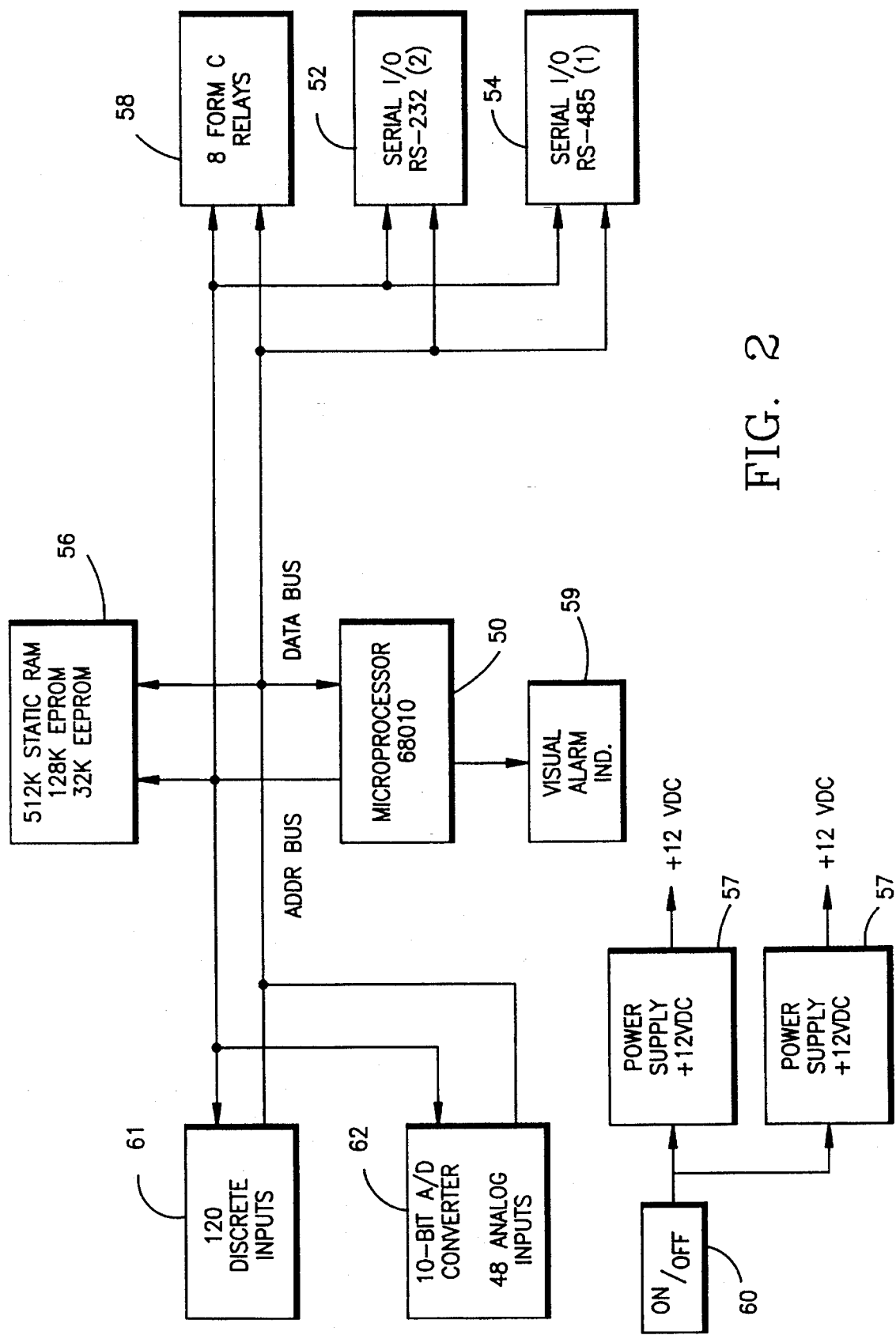
FIG. 2 is a block diagram of a remote terminal unit for use with the system of FIG. 1; and, FIG. 3 is a block diagram of an analog input multiplexer arrangement for use with the remote terminal unit of FIG. 1.

Turning now to FIG. 2, a block diagram of the main elements which make up one of the RTUs 14 is illustrated. The heart of the RTU 14 is a conventional 68010 microprocessor 50 which receives instructions from, and transmits alarm information to, the CMU 12 via either a serial I/O RS-232 interface 52 or a serial I/O RS-485 interface 54. The microprocessor 50 is also coupled to a storage memory means 56 which includes 512K of static RAM, a 128K EPROM and a 32K EEPROM. The RAM is used to store discrete alarm and analog power supply voltage condition information; the EPROM contains the system program or inference engine which operates the RTU 14; and the EEPROM is downloaded remotely by the CMU 12 with operation instructions for the inference engine and a database containing alarm and power supply voltage parameters. In this manner, the RTU 14 can be remotely programmed or reconfigured by the CMU 12 to monitor any desired range of parameter values and number of alarm inputs as discussed in greater detail below. Use of the EPROM and EEPROM for the inference engine, instructions and database is preferred because they are nonvolatile and are therefore not affected by power failures.

A watchdog timer is also preferably incorporated into the hardware and software of each RTU 14 which causes the RTU program to automatically reset in the event that the program malfunctions. For example, if one of the RTUs 14 gets locked in a program which prevents it from communicating with the CMU 12, the watchdog timer will time-out after a preset time interval, e.g. 1.6 seconds, and reset the RTU to particular lines of code in the program which will place it back into communication with the CMU 12.

The RTU 14 is powered by a pair of 12 volt DC power supplies 57 for redundancy so that if one of them fails, the other will serve as a backup until the failed one can be repaired.

The microprocessor 50 can also be instructed from the CMU 12 through the EEPROM to control one or more control relays 58 that can be used, for example, to reset the terminal equipment or to actuate door locks to secure the RTU area in the event of an alarm condition. The relays 58 are conventional Form C relays which are either normally opened or normally closed, depending on the particular application.

The microprocessor 50 provides an output to a visual alarm indicator 59 which communicates alarm conditions to personnel in the vicinity of the RTU 14. An on/off switch 60 is also provided which enables the RTU 14 to be reset locally (i.e., clear memory of alarm information and reset alarm counters).

Up to 120 discrete alarm inputs indicated at 61 can be monitored by the RTU 14 which operate in a binary manner and detect either grounded or open collector conditions of a plurality of circuit points in the monitored communications terminal equipment. Typically, these inputs are obtained from the back panel of the communication terminal chassis and are indicative of relay contact closures resulting from fault conditions in the communications terminal equipment.

The RTU 14 is also designed to monitor analog inputs from up to 48 power supply voltage points in a communications terminal or other terminal equipment. These analog inputs are received by the RTU 14 through a 10 bit 8 channel A/D converter 62 which converts each of the analog inputs into a digital value that is compared to a permissible range of values stored in the memory means 56. The maximum range is preferably +/− 20 VDC with 100 mV resolution, and is remotely configurable by the CMU 12 through the EEPROM as discussed previously. If any of the values fall out of the desired range, an alarm condition will be generated and sent to the CMU 12 which identifies both the identity of the alarm location and the particular alarm condition. The RTU's program can also discriminate between nominal and failure power supply conditions.

Figure 3:
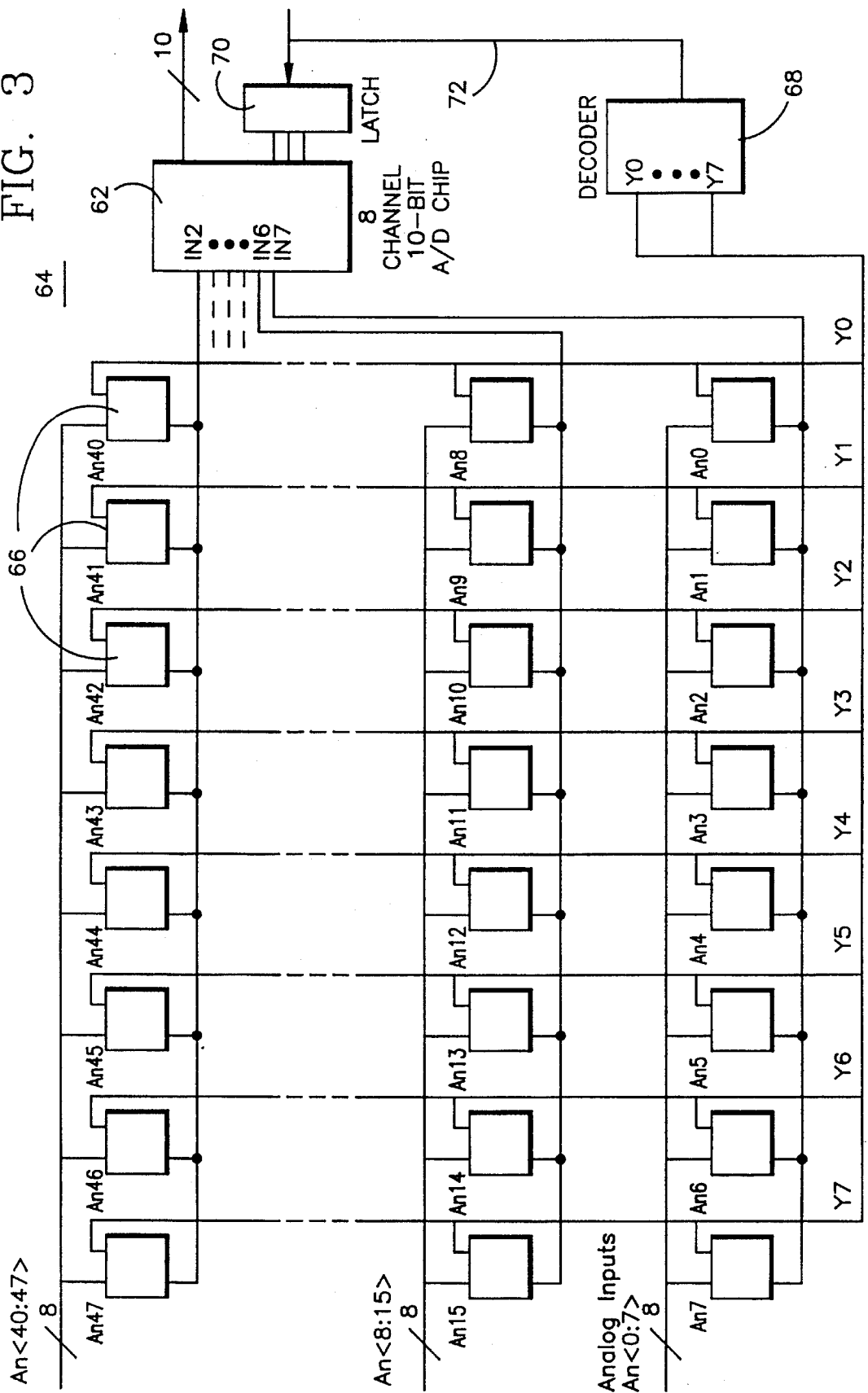

As illustrated in FIG. 3, an analog input multiplexer circuit 64 is employed to interface up to 48 analog inputs to the A/D converter 62. The input multiplexer 64 is formed of 48 quad bilateral switches 66 having control inputs connected to an 8 bit output decoder 68. The switches 66 and decoder 68 are employed for column selection of the analog inputs, while row selection is accomplished by using 6 of the available 8 channels in the A/D converter 62, one for each of the 6 rows of the bilateral switches 66. A latch circuit 70 is connected between the A/D converter 62 and an address bus 72 which permits sequential selection of each of the analog inputs by the microprocessor 50 so that each input is sampled on a periodic basis.

The CMU 12 is loaded with a conventional communication software package that enables the CMU 12 and RTUs 14 to communicate with one another. It also allows the CMU 12 to reprogram or reconfigure each of the RTUs 14 by downloading the programming information into the RTUs' EEPROMs.

The control console of the CMU 12 provides the following additional capabilities. The user can input data pertaining to the location of an RTU, individual alarm point descriptions, and classification of an alarm as a major or minor. Each of the remote units can be reset from the control console and an on screen indication that a remote unit has been reset locally can be displayed. Other on screen indications include activated, acknowledged and corrected alarms including a date and time stamp of each occurrence, and loss of communications between the CMU and an RTU, including a description to determine the lost link. The alarm and relay status of all alarm inputs in each of the RTUs can also be queried, and the audio alarm 44 can be enabled or disabled as desired and by the class of alarm, i.e. major or minor. Finally, all alarm activations, acknowledgments and corrections are stored in a history database in the hard disk 40 and can be retrieved and displayed or printed as desired.

In the operation of the remote monitor alarm system, the inference engine and database containing information pertaining to alarm and power supply voltage parameters is first downloaded from the CMU 12 to each of the RTUs 14. A mirror image of each RTU's database and alarm status is maintained in the CMU's memory at all times. Each of the RTUs 14 monitors the alarm and power supply status or conditions of its associated terminal equipment and determines if a detected alarm condition is major or minor, or in the case of a power supply, if the power supply is in a nominal or failure condition. In this manner, each of the RTUs 14 executes processing tasks that would normally be performed by the CMU 12, thus saving processing time for the CMU 12. As an example, the RTUs 14 can be programmed to report only alarm conditions of a certain type or magnitude.

During polling by the CMU 12, when one of the RTUs 14 detects its address in an alarm status request, it transmits its alarm condition information from its memory to the CMU 12. The CMU 12 then compares this information to its previously stored information for that particular RTU. If there have been no changes since the previous polling cycle, the new data is discarded. If there have been changes, the CMU's memory is updated with these changes. In this manner, the CMU 12 always contains the latest alarm status information from each of the RTUs 14.

In summary, the present invention provides a remote monitor alarm system in which discrete alarm and analog power supply voltage fault condition information can be quickly detected and transmitted to a central monitoring location from a plurality of communication terminals and equipment located in one or more remote locations. The system can detect problems with the terminal equipment before it is even in use, and aids the troubleshooting process by detecting and identifying specific faults in the equipment. Finally, the versatility of the system is enhanced by providing remote reconfiguration and control of the RTUs by the CMU.

Although the present invention has been described in terms of a preferred embodiment, it will be understood that numerous modifications and variations could be made thereto without departing from the scope of the invention as set forth in the following claims.

What is claimed is:

1. A remote monitor alarm system for monitoring alarm conditions of remotely located communications terminal equipment at a central location comprising:
   a) a plurality of remote terminal units, each said unit including:
      i) means to monitor a plurality of discrete alarm points and a plurality of analog power supply voltage points of communications equipment to be monitored; and,
      ii) memory means for storing discrete alarm and analog power supply voltage condition information, and for storing a system program, operation instructions for said program and a database containing alarm and power supply voltage parameters;
   b) a central monitoring unit for monitoring discrete alarm and analog power supply voltage conditions of said remotely located communications terminal equipment, said central monitoring unit including:
      i) means for receiving discrete alarm and analog power supply voltage condition information from each said remote terminal unit;
      ii) memory means for storing discrete alarm and analog power supply voltage condition information received from each said remote terminal unit, a system program for each said remote terminal unit and a database containing alarm and power supply voltage parameters for each said remote terminal unit;
      iii) means for downloading said operation instructions and said database for each said remote terminal unit into the corresponding one of said plurality of remote terminal units; and
   c) communication means connecting said central monitoring unit with each of said remote terminal units.

2. The remote monitor alarm system of claim 1, wherein said means to monitor in each of said remote terminal units includes microprocessor means for monitoring each of said points and determining if an alarm condition exists at any of said points based upon said parameters.

3. The remote monitor alarm system of claim 2 wherein said microprocessor means further includes means to determine whether an alarm condition is major or minor in nature depending upon said parameters.

4. The remote monitor alarm system of claim 2, wherein each said remote terminal unit further includes a plurality of control relays for actuating at least one device in response to a detected alarm condition, each said control relay also being remotely controllable by said central monitoring unit.

5. The remote monitor alarm system of claim 1, wherein said central monitoring unit further includes:
   video display means for displaying alarm and power supply condition information from each of said remote terminal units;
   printer means for printing said alarm and power supply condition information;
   audio alarm means for providing an audible indication of an alarm condition; and,
   input means for data entry.

6. The remote monitor alarm system of claim 1, wherein said central monitoring unit further includes means to sequentially poll each of said remote terminal units, and each of said remote terminal units further includes means to send discrete alarm and analog power supply voltage condition information to said central monitoring unit in response to said polling.

7. The remote monitor alarm system of claim 1, wherein said memory means in each said remote terminal unit includes an EEPROM for receiving said downloaded operation instructions and database from said central monitoring unit.

8. The remote monitor alarm system of claim 1, wherein said central monitoring unit further includes means for remotely resetting each of said remote terminal units, and each of said remote terminal units further includes means for locally resetting said remote terminal unit and providing an indication that it has been locally reset to said central monitoring unit.

9. The remote monitor alarm system of claim 1, wherein said central monitoring unit further includes means for comparing newly received discrete alarm and analog power supply voltage condition information for one of said plurality of remote terminal units to previously stored discrete alarm and analog power supply voltage condition information for said one of said plurality of remote terminal units, and causing the newly received information to be stored in said central monitoring unit's memory means, if it differs from the previously stored information, and to be discarded if it is the same as the previously stored information.

10. The remote monitor alarm system of claim 3, wherein each said remote terminal unit further includes means for sending only major alarm condition information to said central monitoring unit.

11. A method for monitoring alarm conditions of remotely located communications terminal equipment at a central location comprising the steps of:
   a) providing a plurality of remote terminal units, each said unit including:
      i) means for monitoring a plurality of discrete alarm points and a plurality of analog power supply voltage points of communications equipment to be monitored; and
      ii) memory means for storing discrete alarm and analog power supply voltage condition information, and for storing a system program, operation instructions for said program and a database containing alarm and power supply voltage parameters;
   b) providing a central monitoring unit for monitoring discrete alarm and analog power supply voltage conditions of said remotely located communications terminal equipment, said central monitoring unit including:

i) means for receiving discrete alarm and analog power supply voltage condition information from each said remote terminal unit;

ii) memory means for storing discrete alarm and analog power supply voltage condition information for each said remote terminal unit, a system program for each said remote terminal unit and a database containing alarm and power supply voltage parameters for each said remote terminal unit; and, iii) means for downloading said operation instructions and said database for each said remote terminal unit into the corresponding one of each said remote terminal units;

c) storing operation instructions and a database containing alarm and power supply voltage parameters for each said remote terminal unit in said central monitoring unit's memory means;

d) downloading operation instructions and said database containing alarm and power supply voltage parameters from said central monitoring unit into each of said remote terminal units;

e) storing said operation instructions and said database for each of said remote terminal units in each said remote terminal unit's memory means;

f) transmitting alarm and power supply condition information for each of said remote terminal units to said central monitoring unit; and g) storing said alarm and power supply condition information in said central monitoring unit's memory means.

12. The method of claim 11, further comprising the steps of:

h) if an alarm condition is detected and transmitted by at least one of said remote terminal units to said central monitoring unit, causing either said central monitoring unit to reset said at least one remote terminal unit remotely, or causing said at least one remote terminal unit to reset itself locally; and i) if said at least one remote terminal unit resets itself locally, then causing said at least one remote terminal unit to send an indication to said central monitoring unit that said at least one remote terminal unit has been reset locally.

13. The method of claim 11, wherein the step of storing alarm and power supply condition information in said central monitoring unit further comprises:

i) comparing newly received condition information with condition information previously stored in said central monitoring unit for each said remote terminal unit; and ii) storing said newly received condition information in said central monitoring unit only if said newly received condition information differs from said previously stored condition information.

14. The method of claim 11, further comprising the step of causing each said remote terminal unit to discriminate between major and minor alarm conditions, and transmit only major alarm status information to said central monitoring unit.

\* \* \* \* \*